Sept. 2, 1969   J. J. EHRLICH ET AL   3,464,267

LASER POWERMETER

Filed Sept. 14, 1966

John J. Ehrlich
Guilford J. Hutcheson Jr.
Charles M. Rust
Thomas G. Roberts
Charles M. Cason, III
INVENTORS.

BY Harry M. Saragovitz
Edward J. Kelly
Herbert Berl
Alfred E. Smith

3,464,267
LASER POWERMETER
John J. Ehrlich, Guilford J. Hutcheson, Jr., Charles M. Rust, Thomas G. Roberts, and Charles M. Cason III, Huntsville, Ala., assignors to the United States of America as represented by the Secretary of the Army
Filed Sept. 14, 1966, Ser. No. 579,805
Int. Cl. G01k 17/00
U.S. Cl. 73—190       2 Claims

ABSTRACT OF THE DISCLOSURE

A laser beam is directed into a coneshaped member whose inner surface absorbs the beam, converting its energy into heat. A controlled flow of water is directed over the outside of the cone, the increased temperature of the water being related to the power of the laser beam.

---

This invention relates to laser powermeters and particularly relates to a laser powermeter using only tap water as a coolant, for measuring the average output power of continuous wave lasers in the range from $10^{-1}$ to $10^3$ watts, or higher.

Other devices for making these measurements are liquid-helium cooled and usually accept only small amounts of power. Other prior art devices are of the type which neither give the power directly nor do they give a continuous reading of the power. A typical instrument which is commonly used is the ballistic thermopile. This device measures the integrated energy which it absorbs. The average output power of the laser is then obtained by a calculation involving the ballistic thermopile measurement, a calibration factor, and the total time of exposure of the thermopile to the laser beam. The ballistic thermopile is characteristically a slow instrument, and since time must be allowed for the instrument to cool between measurements, at best a measurement can be made only every five minutes. This feature of the ballistic thermopile prevents it from being used in efforts to optomize the output power of the laser.

It is, therefore, an object of this invention to provide a laser powermeter which may be cooled with ordinary tap water.

Another object of this invention is to provide a laser powermeter which requires no calculations to obtain the power being read.

Yet another object of this invention is to provide a laser powermeter which reads the power directly on a continuous basis.

Still another object of this invention is to provide a laser powermeter which is easily operated and rapidly calibrated.

A remaining object of this invention is to provide a laser powermeter which delivers almost instantaneous changes in reading for instantaneous changes in power.

The present invention makes use of the change in temperature of the cooling water to determine the amount of power being measured. The laser beam to be measured is directed into an energy collection cavity which completely absorbs the laser energy and converts it to heat. Regular tap water is fed into the area surrounding the energy collection cavity and the temperature difference between the incoming water and exiting water is sensed. This differential temperature is a function of the amount of energy absorbed. Thus, the change in temperature is registered on a meter calibrated in power units.

Figure 1:
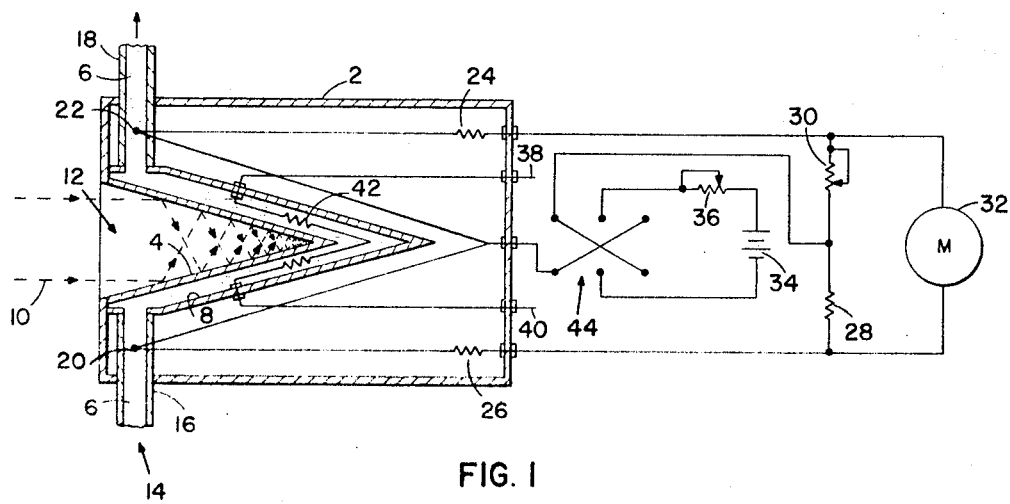
Figure 2:
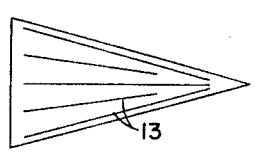
Figure 3:
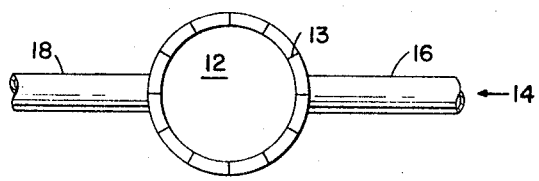

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention and in which:

FIGURE 1 is a digrammatic illustration of the physical elements of the invention; and FIGURE 2 is a view of the energy collection cavity of the present invention showing the cooling fins located thereon; and FIGURE 3 is an end view of the energy collection cavity of the present invention showing the cooling fins and the flow channel for the coolant.

Referring now to the drawing and FIGURE 1 in particular, a preferred embodiment of the present invention is shown and comprises a housing 2 including a conical energy absorbing surface 4 within an energy collection cavity 12. A coolant passage 6 between surface 4 and a second conical surface 8 has a pair of temperature sensing elements 20 and 22 disposed therein for sensing the temperature differential between the water entering at inlet 16 and the water leaving through outlet 18. A meter 32 is connected to sensors 20 and 22 for indicating this temperature differential.

Laser beam 10 is directed into energy collection cavity 12 where the energy is completely absorbed and converted into thermal energy. To absorb the energy of the laser beam a conical cavity is used. A plane flat surface, a conical cavity with a smaller inverted reflecting cone placed at the entrance to prevent energy from being re-radiated, or other means for absorption of the laser energy could form alternate embodiments of the present invention. The absorber used is coated so as to look like a black body at the wavelength of the laser radiation. Carbon black may be used for wavelengths as long as 2 microns, comphor black or Parsons' black may be used for wavelengths out to 20 microns, while oxide coating works well for shorter wavelengths. The response rate can be increased by making the absorbing surface of the thinnest gold foil which has sufficient strength to insure adequate support. The thermal energy is transfered by way of cooling fins 13 shown in FIGURES 2 and 3 to the water 14 which cools the cavity and produces a small temperature rise in the water. Fins 13 are arranged lengthwise of the cone-shaped energy collection cavity to insure proper flow of the water around the apex of the cone. The water enters through entrance pipe 16 and leaves through exit pipe 18. A temperature sensing element 20 is located near the entrance pipe 16 and a similar temperature sensing element 22 is located near the exit pipe 18. The difference in the temperature of the water entering pipe 16 and leaving pipe 18 is related in a simple manner to the average power in the laser beam. The response rate of the laser powermeter (time delay between instantaneous change in laser energy and the time at which the meter indicates this change) is directly proportional to the flow rate of the water. The sensitivity of the present invention is inversely proportional to the flow rate of the water. This temperature difference is measured and displayed in a convenient manner. A particularly simple method is to incorporate the temperature sensing elements 20 and 22 in a bridge circuit where the amount of unbalance of the bridge is proportional to the temperature difference and hence to the average power in the laser beam. In this type of circuit the resistors 24, 26, 28 and 30 form the elements of the bridge and their values are determined by the sensing elements selected for sensing elements 20 and 22. Thermopiles, resistance thermometers, thermistors, or any other temperature sensing elements may be used for sensing elements 20 and 22. Thermistors are presently available which have the ability to sense one one-thousandth of a degree change in temperature. Resistor 30 is made variable so the bridge can be balanced to give a zero reading on meter 32 when no energy is entering the cavity 12. Power is supplied to the bridge by the power supply 34. The variable resistor 36 is used to adjust the sensitivity of the bridge. The switch 44 is used to turn the powermeter on and off or to reverse the polarity if this is desirable. The power is read out directly on meter 32 which is a micrometer. A meter could be employed which has a selection switch thereon for selection of the power range within which the meter is to operate, microwatts, watts, kilowatts, etc.

To calibrate the powermeter a known amount of electrical power from an external source is applied through terminals 38 and 40 to the heater 42. With no energy entering the cavity 12, the deflection of meter 32 is proportional to the power applied to the heater 42. The sensing elements 20 and 22 can be chosen to be linear over the temperature range involved so that only one calibration point is required, then by use of resistor 36, the meter 32 can be set to read power directly. If the elements chosen for temperature sensing elements 20 and 22 are not linear then a series of calibrated points will have to be taken. The laser powermeter may also be calibrated by using a laser of known power. The laser is directed into the collection cavity and the meter adjusted to read what it should read. When the laser can be used, the reflectance of the absorber and any imperfection of the surface are automatically accounted for.

While the invention has been described with reference to a preferred embodiment thereof, it will be apparent that various modifications and other embodiments thereof will occur to those skilled in the art within the scope of the invention. Accordingly, we desire the scope of our invention to be limited only by the appended claims.

What is claimed is:

1. A laser power meter comprising means for converting laser energy to thermal energy; means for determining the amount of thermal energy; and means relating said amount to the power of said laser; said means for converting laser energy into thermal energy comprising a first conical member having an energy absorbing inner surface disposed for receiving and absorbing said laser energy; said means for determining the amount of thermal energy comprising: a coolant, a second conical member disposed adjacent the outside surface of said first conical member to form a coolant flow passage therebetween, said coolant passage including an inlet portion and an outlet portion, and means for sensing the temperature of the coolant at said inlet and said outlet to said coolant passage.

2. A laser powermeter as set forth in claim 1 to further include cooling fins located on the exterior surface of said first conical member.

References Cited

UNITED STATES PATENTS

| | | | |
|---|---|---|---|
| 1,997,383 | 4/1935 | Junkers | 73—190 |
| 3,188,473 | 6/1965 | Bates et al. | |
| 3,391,279 | 7/1968 | Detrio. | |

OTHER REFERENCES

An article entitled "A Microwave Thermistor Calorimeter" by Smith et al. from "Journal of Scientific Instruments" September 1956, pp.353–6.

An article entitled "Measurement of The Energy and Power of Lasers" by Valitov et al. May 1965.

JAMES J. GILL, Primary Examiner